(12) United States Patent
Gholmieh et al.

(10) Patent No.: US 8,514,732 B2
(45) Date of Patent: Aug. 20, 2013

(54) SYSTEM AND METHOD FOR EFFECTUATING A SIGNAL CARRIER CONFIGURATION

(75) Inventors: Aziz Gholmieh, Del Mar, CA (US); Arjun Bharadwaj, San Diego, CA (US); Heechoon Lee, San Diego, CA (US); Bibhu Prasad Mohanty, San Diego, CA (US); Sharad Deepak Sambhwani, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 12/724,368

(22) Filed: Mar. 15, 2010

(65) Prior Publication Data

US 2010/0238986 A1      Sep. 23, 2010

Related U.S. Application Data

(60) Provisional application No. 61/160,822, filed on Mar. 17, 2009.

(51) Int. Cl.
*H04L 12/26* (2006.01)
(52) U.S. Cl.
USPC .......................................... 370/252; 370/238
(58) Field of Classification Search
USPC ............................ 370/252, 253, 254, 238, 208
See application file for complete search history.

(56) References Cited

U.S. PATENT DOCUMENTS

| 2004/0240535 | A1 | 12/2004 | Verma et al. |
| 2011/0096727 | A1* | 4/2011 | Bergman et al. ............ 370/328 |
| 2011/0194455 | A1* | 8/2011 | Aminaka et al. ............ 370/252 |
| 2012/0082054 | A1* | 4/2012 | Gholmieh et al. ............ 370/252 |

FOREIGN PATENT DOCUMENTS

| JP | 2001148678 A | 5/2001 |
| WO | WO2009001281 A2 | 12/2008 |

OTHER PUBLICATIONS

International Search Report and Written Opinion—PCT/US2010/027671, ISA/EPO—May 17, 2011.
Qualcomm Europe, "DC-HSDPA and CPC", 3GPP Draft, R2-083394, 3RD Generation Partnership Project (3GPP), Mobile Competence Centre, 650, Route Des Lucioles, F-06921 Sophia-Antipolis Cedex, France, vol. RAN WG2, No. Warsaw, Poland, 20080624, Jun. 24, 2008, XP050140788.
Qualcomm Europe, "HS-SCCH Orders for Secondary Carrier Activation/De-Activation in DC-HSUPA", 3GPP TSG-RAN WG1#57 R1-091858, May 4, 2009, p.1-p.5, URL, http://www.3gpp.org/ftp/tsg_ran/WG1_RL1/TSGR1_57/Docs/R1-091858.zip.
Zte, "Carrier activation for 4C-HSDPA," 3GPP TSG RAN WG1 #59 R1-094760, Nov. 9, 2009, p.1-p.5, URL, http://www.3gpp.org/ftp/ts_ran/WG1_RL1/TSGR1_59/Docs/R1-094760.zip.

* cited by examiner

*Primary Examiner* — Gary Mui
(74) *Attorney, Agent, or Firm* — Darren M. Simon (57) ABSTRACT

Systems and methods for effectuating a signal carrier configuration are disclosed. In one embodiment, the method comprises receiving an order, determining a signal carrier on which the order was received, determining a signal carrier configuration based at least in part on the order and the determined signal carrier, and changing the state of one or more signal carriers to effectuate the signal carrier configuration.

27 Claims, 10 Drawing Sheets

FIG. 1

| Con. # | Carrier1 | Carrier2 | Carrier3 | Carrier4 |
|---|---|---|---|---|
| 1 | Inactive | Inactive | Inactive | Inactive |
| 2 | Active | Inactive | Inactive | Inactive |
| 3 | Inactive | Active | Inactive | Inactive |
| 4 | Active | Active | Inactive | Inactive |
| 5 | Inactive | Inactive | Active | Inactive |
| 6 | Active | Inactive | Active | Inactive |
| 7 | Inactive | Active | Active | Inactive |
| 8 | Active | Active | Active | Inactive |
| 9 | Inactive | Inactive | Inactive | Active |
| 10 | Active | Inactive | Inactive | Active |
| 11 | Inactive | Active | Inactive | Active |
| 12 | Active | Active | Inactive | Active |
| 13 | Inactive | Inactive | Active | Active |
| 14 | Active | Inactive | Active | Active |
| 15 | Inactive | Active | Active | Active |
| 16 | Active | Active | Active | Active |

FIG. 2

| Con. # | Carrier1 | Carrier2 | Carrier3 | Carrier4 |
|---|---|---|---|---|
| 1 | 000 | | | |
| 2 | 001 | | | |
| 3 | 010 | | | |
| 4 | 011 | | | |
| 5 | 100 | | | |
| 6 | 101 | | | |
| 7 | 110 | | | |
| 8 | 111 | | | |
| 9 | | 000 | | |
| 10 | | 001 | | |
| 11 | | 010 | | |
| 12 | | 011 | | |
| 13 | | 100 | | |
| 14 | | 101 | | |
| 15 | | 110 | | |
| 16 | | 111 | | |

FIG. 3

| Con. # | Carrier1 | Carrier2 | Carrier3 | Carrier4 |
|---|---|---|---|---|
| 1 | 00 | | | |
| 2 | 01 | | | |
| 3 | 10 | | | |
| 4 | 11 | | | |
| 5 | | 00 | | |
| 6 | | 01 | | |
| 7 | | 10 | | |
| 8 | | 11 | | |
| 9 | | | 00 | |
| 10 | | | 01 | |
| 11 | | | 10 | |
| 12 | | | 11 | |
| 13 | | | | 00 |
| 14 | | | | 01 |
| 15 | | | | 10 |
| 16 | | | | 11 |

FIG. 4

| Con. # | Carrier1 | Carrier2 | Carrier3 | Carrier4 |
|---|---|---|---|---|
| 1 | 00 | | | |
| 2 | 01 | | | |
| 3 | 10 | | | |
| 4 | 11 | | | |
| 5 | | 00 | | |
| 6 | | 01 | | |
| 7 | | 10 | | |
| 8 | | 11 | | |
| 9 | | | 000 | |
| 10 | | | 001 | |
| 11 | | | 010 | |
| 12 | | | 011 | |
| 13 | | | 100 | |
| 14 | | | 101 | |
| 15 | | | 110 | |
| 16 | | | 111 | |

FIG. 5

| Con. # | DL Carrier 1 | UL Carrier 1 | DL Carrier 2 | UL Carrier 2 |
|---|---|---|---|---|
| 1 | Inactive | Inactive | Inactive | Inactive |
| 2 | Active | Inactive | Inactive | Inactive |
| 3 | Inactive | Active | Inactive | Inactive |
| 4 | Active | Active | Inactive | Inactive |
| 5 | Inactive | Inactive | Active | Inactive |
| 6 | Active | Inactive | Active | Inactive |
| 7 | Inactive | Active | Active | Inactive |
| 8 | Active | Active | Active | Inactive |
| 9 | Inactive | Inactive | Inactive | Active |
| 10 | Active | Inactive | Inactive | Active |
| 11 | Inactive | Active | Inactive | Active |
| 12 | Active | Active | Inactive | Active |
| 13 | Inactive | Inactive | Active | Active |
| 14 | Active | Inactive | Active | Active |
| 15 | Inactive | Active | Active | Active |
| 16 | Active | Active | Active | Active |

FIG. 6

| Con. # | DL Carrier 1 | UL Carrier 1 | DL Carrier 2 | UL Carrier 2 |
|---|---|---|---|---|
| 1 | 000 | | | |
| 2 | 001 | | | |
| 3 | 010 | | | |
| 4 | 011 | | | |
| 5 | 100 | | | |
| 6 | 101 | | | |
| 7 | 110 | | | |
| 8 | 111 | | | |
| 9 | | | 000 | |
| 10 | | | 001 | |
| 11 | | | 010 | |
| 12 | | | 011 | |
| 13 | | | 100 | |
| 14 | | | 101 | |
| 15 | | | 110 | |
| 16 | | | 111 | |

FIG. 7

| Order | Action |
|---|---|
| 00 | Activate downlink on this carrier |
| 01 | Activate uplink on this carrier |
| 10 | Deactivate uplink on this carrier |
| 11 | Deactivate uplink and downlink on this carrier |

FIG. 8

| Order | Action |
|---|---|
| 000 | Activate uplink on this carrier |
| 001 | Deactivate uplink on this carrier |
| 010 | Deactivate downlink and uplink on this carrier |
| 011 | Activate downlink on the next carrier |
| 100 | Activate downlink and uplink on the next carrier |
| 101 | Deactivate downlink and uplink on the next carrier |
| 110 | Activate downlink and uplink on the previous carrier |
| 111 | Deactivate downlink and uplink on the previous carrier |

FIG. 9

| Order | Action |
|---|---|
| 000 | Activate uplink on this carrier |
| 001 | Deactivate uplink on this carrier |
| 010 | Deactivate downlink and uplink on this carrier |
| 011 | Activate downlink on the next carrier |
| 100 | Activate downlink and uplink on the next carrier |
| 101 | Deactivate downlink and uplink on the next carrier |
| 110 | Return to single carrier operation on this carrier |
| 111 | Return to single carrier operation on designated carrier |

FIG. 10

| If order Tx on Carrier | B= | C= | D= |
|---|---|---|---|
| 1 | 2 | 3 | 4 |
| 2 | 1 | 3 | 4 |
| 3 | 1 | 2 | 4 |
| 4 | 1 | 2 | 3 |

FIG. 11

| Order | Action |
|---|---|
| 000 | Deactivate downlink carriers B,C, and D |
| 001 | Activate downlink carrier B / Deactivate downlink carriers C and D |
| 010 | Activate downlink carrier C / Deactivate downlink carriers B and D |
| 011 | Activate downlink carrier D / Deactivate downlink carriers B and C |
| 100 | Activate downlink carriers B and C / Deactivate downlink carrier D |
| 101 | Activate downlink carriers B and D / Deactivate downlink carrier C |
| 110 | Activate downlink carriers C and D / Deactivate downlink carrier B |
| 111 | Activate downlink carriers B, C, and D |

FIG. 12

| Order | Action |
|---|---|
| 000 | Deactivate uplink carriers B,C, and D |
| 001 | Activate uplink carrier B / Deactivate downlink carriers C and D |
| 010 | Activate uplink carrier C / Deactivate downlink carriers B and D |
| 011 | Activate uplink carrier D / Deactivate downlink carriers B and C |
| 100 | Activate uplink carriers B and C / Deactivate downlink carrier D |
| 101 | Activate uplink carriers B and D / Deactivate downlink carrier C |
| 110 | Activate uplink carriers C and D / Deactivate downlink carrier B |
| 111 | Activate uplink carriers B, C, and D |

FIG. 13

| Con. # | DL Carrier 1 | UL Carrier 1 | DL Carrier 2 | UL Carrier 2 |
|---|---|---|---|---|
| 1 | X | X | | |
| 2 | X | X | X | |
| 3 | | | X | X |
| 4 | X | | X | X |
| 5 | X | X | X | X |

SYSTEM AND METHOD FOR EFFECTUATING A SIGNAL CARRIER CONFIGURATION

CROSS-REFERENCE TO RELATED APPLICATIONS

This application claims priority under 35 U.S.C. §119(e) to U.S. Provisional Patent App. No. 61/160,822 filed Mar. 17, 2009, which is herein incorporated by reference in its entirety.

BACKGROUND

1. Field

The disclosure relates to the activation and deactivation of communication links in a digital communication system.

2. Description of the Related Technology

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on one or more forward and/or reverse links. A forward link (or downlink) refers to the communication link (or signal carrier) from the base stations to the terminals, and a reverse link (or uplink) refers to the communication link (or signal carrier) from the terminals to the base stations. These communication links may be established by a single-in-single-out (SISO), multiple-in-single-out (MISO) or a multiple-in-multiple-out (MIMO) system. A signal carrier is configured to carry a signal and may be an uplink channel, a downlink channel, or both. The signal carrier may correspond, in one embodiment, to a RF channel or a portion thereof. For example, in one embodiment, the signal carrier corresponds to a specific frequency, band of frequencies, or a non-contiguous set of frequencies. Such an embodiment may be used in a frequency division duplex system. As another example, in another embodiment, the signal carrier corresponds to a particular transmission/reception time or a periodic set of times. Such an embodiment may be used in a time division duplex system.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide for effectuation of signal carrier configurations including the activation and deactivation of specific carriers.

One aspect is a method of effectuating a signal carrier configuration, the method comprising receiving an order having a number of bits, determining a signal carrier configuration indicative of a state of each of a number of supplemental signal carriers based at least in part on the order, wherein the number of bits is less than the number of supplemental signal carriers, and changing the state of one or more signal carriers to effectuate the signal carrier configuration.

Another aspect is an electronic device comprising a transceiver configured to communicate with a base station over at least one primary carrier and a number of active supplemental signal carriers selected from a number of supplemental signal carriers as determined by a signal carrier configuration, a processor configured to receive an order having a number of bits via the transceiver, wherein the number of bits is less than the number of supplemental signal carriers, determines an ordered signal carrier configuration indicative of a state of each of the supplemental signal carriers based at least in part on the order, and reconfigures the transceiver to communicate with the base station over the at least one primary signal carrier and a number of active supplemental signal carriers selected from the number of supplemental signal carriers as determined by the ordered signal carrier configuration.

Another aspect is an electronic device comprising means for receiving an order having a number of bits, means for determining a signal carrier configuration indicative of a state of each of a number of supplemental signal carriers based at least in part on the order, wherein the number of bits is less than the number of signal carriers, and means for changing the state of one or more of the supplemental signal carriers to effectuate the signal carrier configuration.

Another aspect is a computer-readable storage medium having instructions encoded thereon which, when executed by one or more processors, causes an electronic device to perform a method of effectuating a signal carrier configuration, the method comprising receiving an order having a number of bits, determining a signal carrier configuration indicative of a state of each of a number of supplemental signal carriers based at least in part on the order, wherein the number of bits is less than the number of signal carriers, and changing the state of one or more of the supplemental signal carriers to effectuate the signal carrier configuration.

One aspect is a method of transmitting an order, the method comprising determining a desired signal carrier configuration indicative of a state of each of a number of supplemental signal carriers, determining an order based at least in part on the desired signal carrier configuration, the order having a number of bits less than the number of supplemental signal carriers, and sending the order.

Another aspect is an electronic device comprising a transceiver configured to communicate with a user device over at least one primary carrier and a number of active supplemental carriers selected from a number of supplemental signal carriers according to a signal carrier configuration, and a processor configured to determine a desired signal carrier configuration, determine an order based at least in part on the desired signal carrier configuration, the order having a number of bits less than the number of supplemental signal carriers, and send, using the transceiver, the order.

Another aspect is an electronic device comprising means for determining a desired signal carrier configuration indicative of a state of each of a number of supplemental signal carriers, means for determining an order based at least in part on the desired signal carrier configuration, the order having a number of bits less than the number of supplemental signal carriers, and means for sending the order.

Another aspect is a computer-readable storage medium having instructions encoded thereon which, when executed by one or more processors, causes an electronic device to perform a method of sending an order, the method comprising determining a desired signal carrier configuration indicative of a state of each of a number of supplemental signal carriers, determining an order based at least in part on the desired signal carrier configuration, the order having a number of bits less than the number of supplemental signal carriers, and sending the order.

DETAILED DESCRIPTION OF CERTAIN EMBODIMENTS

Figure 1:
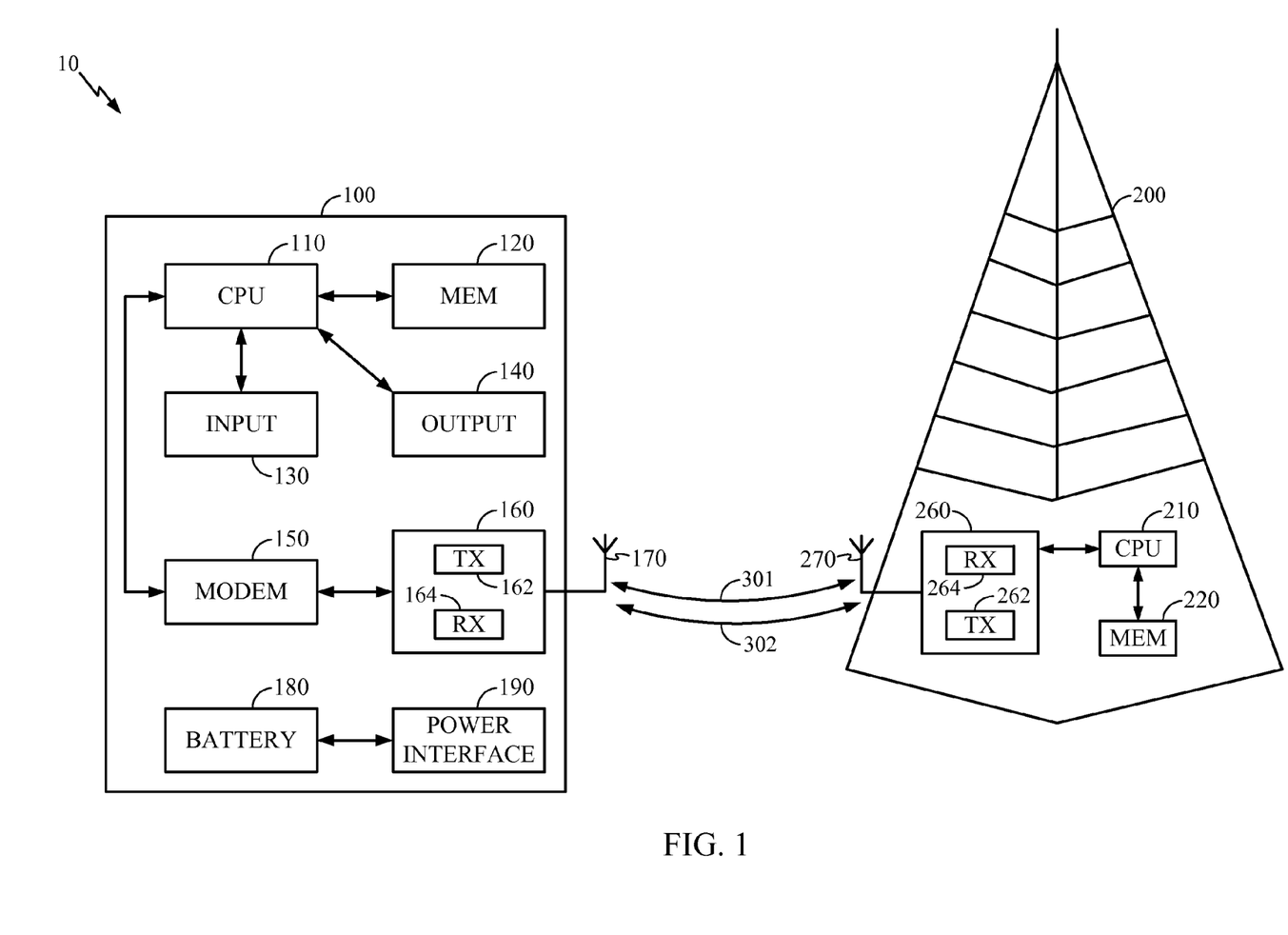
FIG. 1 is a functional block diagram of a wireless communication system.

FIG. 1 is a functional block diagram of a wireless communication system 10. The wireless communication system 10 includes at least one user equipment 100 and at least one base station 200 communicating with each other over a first communication link (or carrier) 301 and a second communication link (or carrier) 302. Each of the first and second carriers 301, 302 can be an uplink carrier, a downlink carrier, or an uplink/downlink carrier. Further, each of the first and second carriers 301, 302 may be either in an active state, in which data is transmitted via the carrier, or in an inactive state, in which data is not transmitted via the carrier.

The user equipment 100 includes a processor 110 in data communication with a memory 120, an input device 130, and an output device 140. The processor is further in data communication with a modem 150 and a transceiver 160. The transceiver 160 is also in data communication with the modem 150 and an antenna 170. The user equipment 100 and components thereof are powered by a battery 180 and/or an external power source. In some embodiments, the battery 180, or a portion thereof, is rechargeable by an external power source via a power interface 190. Although described separately, it is to be appreciated that functional blocks described with respect to the user equipment 100 need not be separate structural elements. For example, the processor 110 and memory 120 may be embodied in a single chip. Similarly, two or more of the processor 110, modem 150, and transceiver 160 may be embodied in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor 110 may also be implemented as a combination of computing devices, e.g., a combination of a DSP and a microprocessor, a plurality of microprocessors, one or more microprocessors in conjunction with a DSP core, or any other such configuration.

The processor 110 can be coupled, via one or more buses, to read information from or write information to the memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110 is also coupled to an input device 130 and an output device 140 for, respectively, receiving input from and providing output to, a user of the user equipment 100. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 110 is further coupled to a modem 150 and a transceiver 160. The modem 150 and transceiver 160 prepare data generated by the processor 110 for wireless transmission over the carriers 301, 302 via the antenna 170 according to one or more air interface standards. The modem 150 and transceiver 160 also demodulate data received over the carriers 301, 302 via the antenna 170 according to one or more air interface standards. The transceiver can include a transmitter 162, a receiver 164, or both. In other embodiments, the transmitter 162 and receiver 164 are two separate components. The modem 150 and transceiver 160, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The antenna 170 can include multiple antennas.

The user equipment 100 and components thereof are powered by a battery 180 and/or an external power source. The battery 180 can be any device which stores energy, and particularly any device which stores chemical energy and provides it as electrical energy. The battery 180 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some embodiments, the battery 180, or a portion thereof, is rechargeable by an external power source via a power interface 190. The power interface 190 can include a jack for connecting a battery charger, an inductor for near field wireless energy transfer, or a photovoltaic panel for converting solar energy into electrical energy.

In some embodiments, the user equipment 100 is, for example, but not limited to a mobile telephone, a personal data assistant (PDAs), a hand-held computer, a laptop computer, a wireless data access card, a GPS receiver/navigator, a camera, an MP3 player, a camcorder, a game console, a wrist watch, a clock, or a television.

The base station 200 also includes at least a processor 210 coupled to a memory 220 and a transceiver 260. The transceiver 260 includes a transmitter 262 and a receiver 264 coupled to an antenna 270. The processor 210, memory 220, transceiver 260, and antenna 270 can be embodied as described above with respect to the user equipment 100.

A signal carrier configuration designates which available signal carriers between two devices are to be in an active state and which available signal carriers are to be in an inactive state. For example, with respect to FIG. 1, a signal carrier configuration can designate which, if either, of the first and second signal carriers 301, 302 between the user equipment 100 and the base station 200 are to be active, and which, if either, of the first and second signal carriers 301, 302 are to be inactive.

In the case of two signal carriers, there are four possible signal carrier configurations, 1) both signal carriers in the inactive state, 2) the first signal carrier in the active state and the second signal carrier in the inactive state, 3) the first signal carrier in the inactive state and the second signal carrier in the active state, and 4) both signal carriers in the active state. The discussion below with respect to FIGS. 2-5 assumes that each signal carrier, or simply carrier, is capable of both uplink and downlink communication.

Assuming that only one of the carriers is active, an order from the base station 200 indicating which of the four configurations the user equipment 100 should be configured into would require two bits. For example, an order of '00' could instruct the user equipment 100 to effectuate configuration 1, an order of '01' could instruct the user equipment 100 to effectuate configuration 2, an order of '10' could instruct the user equipment to effectuate configuration 3, and an order of '11' could instruct the user equipment to effectuate configuration 4.

Assuming that both of the carriers are active, the same two-bit order could be transmitted by the base station 200 on either carrier to indicate the desired configuration. However, when both of the carriers are active, the selection of which carrier to transmit the order on reduces the necessary length of the order by one bit. For example, an order of '0' transmitted on the first carrier could instruct the user equipment 100 to effectuate configuration 1, an order of '1' transmitted on the first carrier could instruct the user equipment 100 to effectuate configuration 2, an order of '0' on the second carrier could instruct the user equipment 100 to effectuate configuration 3, and an order of '1' on the second carrier could instruct the user equipment 100 to effectuate configuration 4. Thus, by selecting which carrier to transmit the order over, the number of bits required to communicate the desired carrier configuration, and thus the number of bits of the order, is, on average, reduced.

Figure 2:
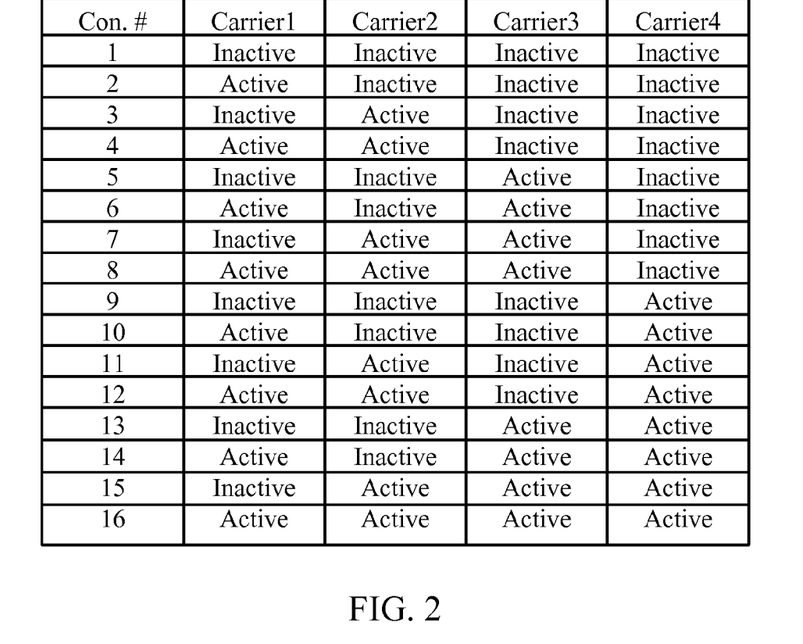
FIG. 2 is a table illustrating exemplary signal carrier configurations for a system having four carriers.
Figure 3:
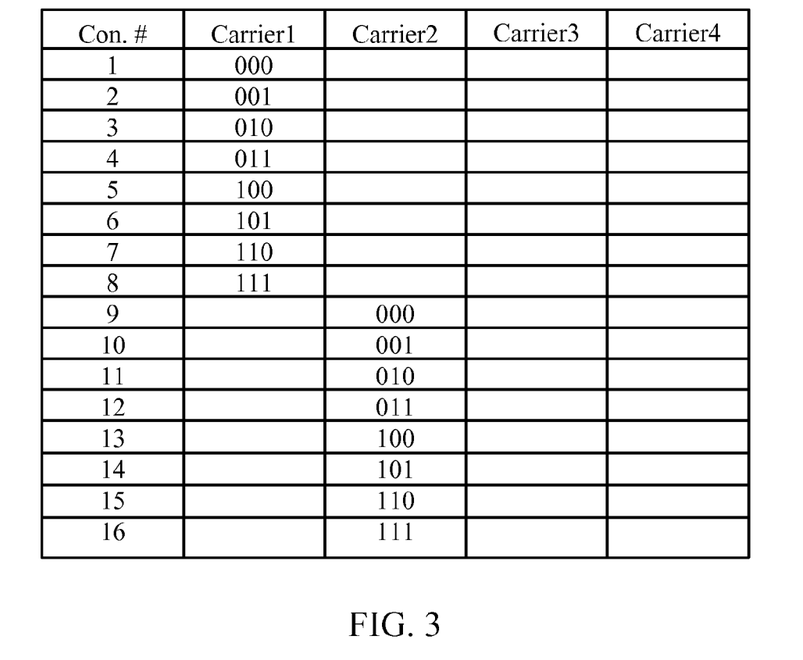
FIG. 3 is a table illustrating exemplary three-bit orders which designate a signal carrier configuration for a system having four carriers.
Figure 4:
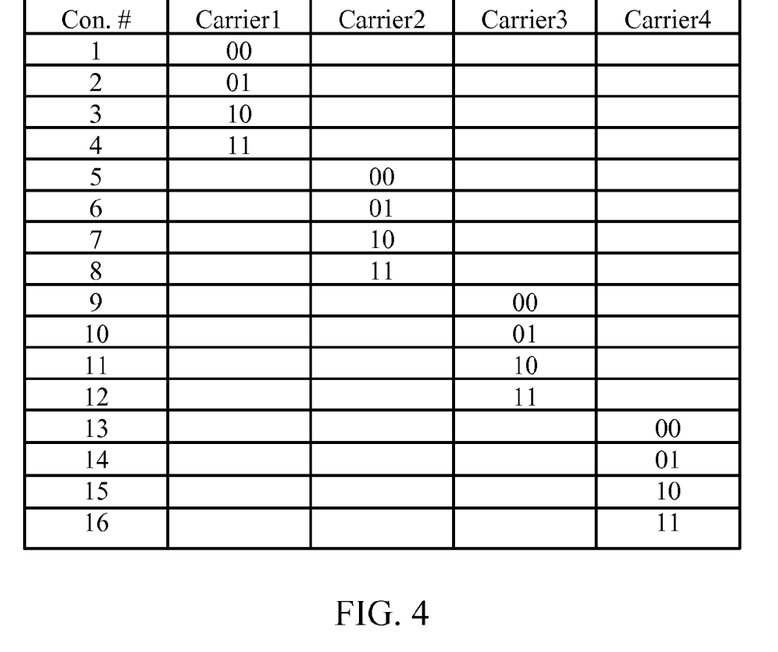
FIG. 4 is a table illustrating exemplary two-bit orders which designate a signal carrier configuration for a system having four carriers.

When there are four carriers between the user equipment 100 and the base station 200, there are sixteen possible signal carrier configurations, as shown in FIG. 2. Assuming that only one of the carriers is active, an order from the base station 200 indicating which of the sixteen configurations the user equipment 100 should effectuate would require four bits. As above, assuming that more than one of the carriers is active, the same four-bit order could be transmitted on any carrier to indicate the desired configuration. However, when two of the carriers are active, the selection of which carrier to transmit the order over reduces the necessary length of the order by one bit as shown in FIG. 3. Further, when all four of the carriers are active, the length of the order can be reduced by two bits as shown in FIG. 4.

Figure 5:
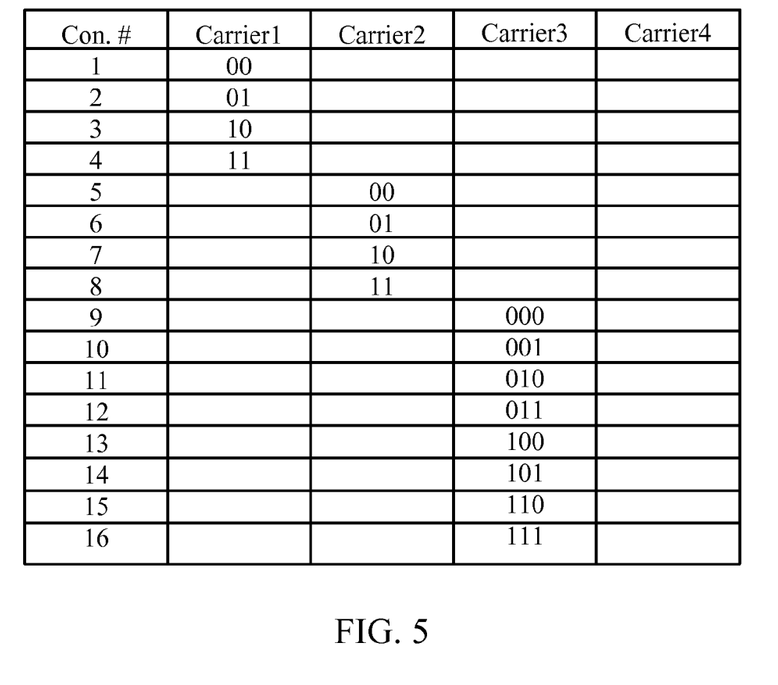
FIG. 5 is a table illustrating exemplary mixed-length orders which designate a signal carrier configuration for a system having four carriers.

In one embodiment, when three of the carriers are active, the length of the order depends on the desired signal carrier configuration, with two bits used for the eight of the signal carrier configurations and three bits used for the other eight signal carrier configurations as shown in FIG. 5. Thus, just as in the case of two available carriers, by selecting which carrier out of four available carriers to transmit the order on, the number of bits required to communicate the desired carrier configuration, and thus the number of bits of the order, is, on average, reduced.

Figure 6:
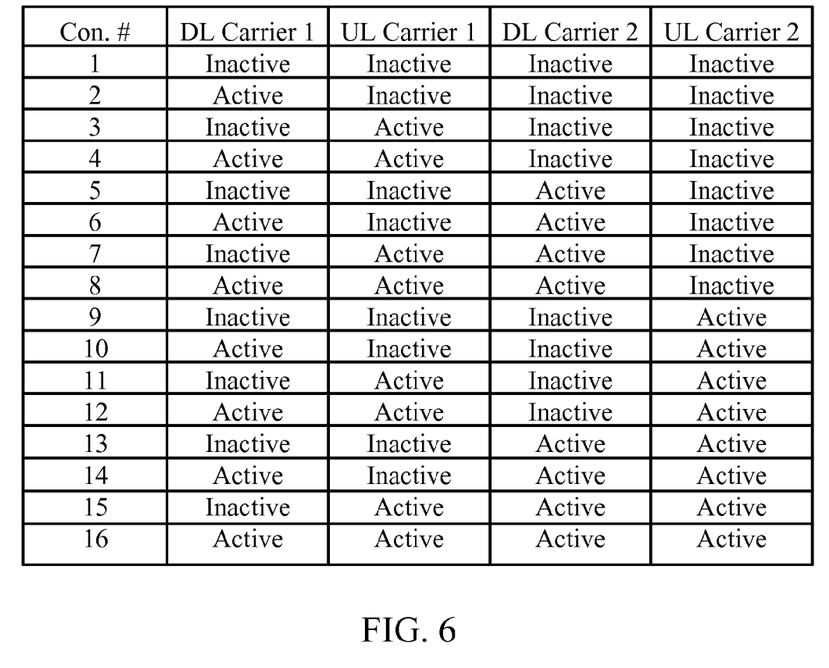
FIG. 6 is a table illustrating exemplary signal carrier configurations for a system having two downlink carriers and two uplink carriers.

The discussion above with respect to FIGS. 2-5 has assumed that an order could be transmitted and received on any of the carriers. In some communication systems, some signal carriers are designated downlink carriers in which data, including orders, can be transmitted from a first device to a second device, or uplink carriers in which data can be transmitted from the second device to the first device. Although such a second device cannot receive orders on an uplink carrier, the same bit-saving principle applies as discussed below with respect to FIGS. 6 and 7 as the device can receive orders via the downlink carrier. In the case of two uplink carriers and two downlink carriers, there are sixteen possible signal carrier configurations as shown in FIG. 6.

Figure 7:
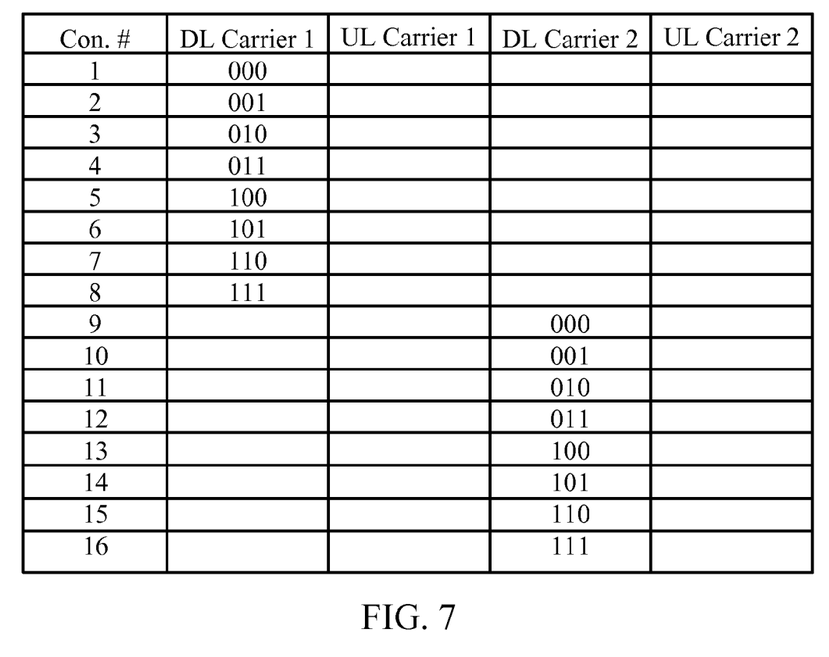
FIG. 7 is a table illustrating exemplary orders which designate a signal carrier configuration for a system having two downlink carriers and two uplink carriers.

Assuming that only one of the downlink carriers is active, an order from the base station 200 indicating which of the sixteen signal carrier configurations the user equipment 100 should effectuate would require four bits. Assuming that both of the downlinks carriers are active, the same four-bit order could be transmitted on either downlink carrier to indicate the desired signal carrier configuration. However, when both of the downlink carriers are active, the selection of which downlink carrier to transmit the order on reduces the necessary length of the order by one bit as shown in FIG. 7. Thus, by selecting which downlink carrier to transmit the order on, the number of bits required to communicate the desired carrier configuration, and thus the number of bits of the order, is, on average, reduced.

The above discussion with respect to FIGS. 2-7 has assumed that the length of order, in bits, can be variable. For example, with respect to FIGS. 2-5, the base station 200 can transmit a four-bit order if only one carrier is active, a three-bit order if two carriers are active, or a two-bit order if four carriers are active. In some communication systems, the length of the order is fixed. However, the average length of the order can be reduced even in such cases as is discussed below. As shown above in FIG. 6, there are sixteen possible signal carrier configurations in the case of two uplink carriers and two downlink carriers. As shown in FIG. 7, when both downlink carriers are active, the selection of which downlink carrier to transmit the order on reduces the necessary length of the order to three bits.

However, assuming that only one of the downlink carriers is active, a three-bit order is insufficient to designate all of the possible carrier configurations. If the order length is fixed at three bits to take advantage of the savings when both downlink carriers are active, two orders may, depending on the desired configured, be required when only one downlink carrier is active. For example, a first order may be transmitted by the base station 200 to instruct the user equipment 100 to activate the other downlink carrier and a second order may be transmitted by the base station 200 to communicate the desired final configuration to the user equipment 100 and instruct the user equipment 100 to effectuate it by activating and/or deactivating specific signal carriers. For certain signal carrier configurations, when only one of the downlink carriers are active, activation of the other downlink carrier will not be necessary and only one order is required to communicate the desired configuration.

When both downlink carriers are active, the orders transmitted may be those illustrated in FIG. 7 to communicate the desired configuration. When only downlink carrier 1 is active, and one of signal carrier configurations 1-8 are desired, the appropriate order from FIG. 7 can be transmitted on downlink carrier 1. When only downlink carrier 1 is active, and one of the configurations 9-16 is desired, one of orders 4-8 from FIG. 7 may be transmitted on downlink carrier 1 to activate downlink carrier 2 before the appropriate order illustrated in FIG. 7 is transmitted on downlink carrier 2. When only downlink carrier 2 is active, and one of the configurations 9-16 is desired, the appropriate order from FIG. 7 can be transmitted on downlink carrier 2. When only downlink carrier 2 is active, and one of the configurations 1-8 is desired, one of orders 10, 12, 14, or 16 from FIG. 7 may be transmitted on downlink carrier 2 to activate downlink carrier 1 before the order illustrated in FIG. 7 is transmitted on downlink carrier 1.

In the case of four uplink carriers and four downlink carriers, it will be appreciated that an order of eight bits is sufficient to designate any of the 128 possible signal carrier configurations. As explained above, by selecting which downlink carrier to transmit the order on, the number of bits required to communicate the desired carrier configuration and thus the number of bits of the order, is, on average, reduced. When multiple downlink carriers are active, the number of bits required can be reduced. For example, when four downlink carriers are active, the number of bits required can be reduced by two.

Figure 8:
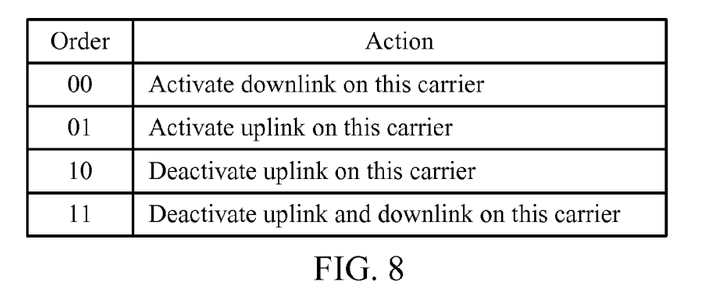
FIG. 8 is a table of four orders which can be transmitted on a downlink carrier to indicate a signal carrier configuration.

In another embodiment, multiple orders of a fixed length of two bits can be transmitted by the base station 200 to the user equipment 100 to communicate a desired configuration. FIG. 8 is a table of four orders which can be transmitted on a downlink carrier to indicate a signal carrier configuration.

By repeatedly transmitting the orders shown in FIG. 8 on various downlink carriers, any configuration can be communicated. Although the orders can be used in the case of four downlink carriers and four uplink carriers, the same orders can be used for any number of uplink and/or downlink carriers. In one embodiment, "next" means the active carrier with the next higher UARFCN (UTRA Absolute RF Channel Number). In one embodiment, the carriers are cyclically ordered such that downlink carrier 1 is the "next" downlink carrier of downlink carrier 4.

Figure 9:
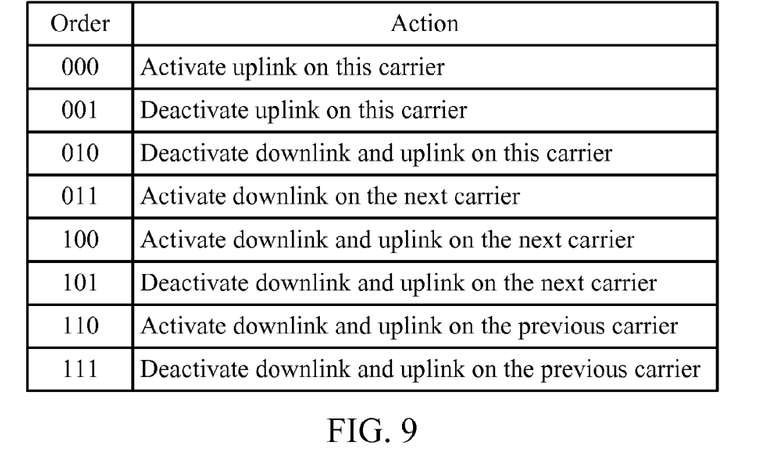
FIG. 9 is a table of eight orders which can be transmitted on a downlink carrier to indicate a signal carrier configuration.
Figure 10:
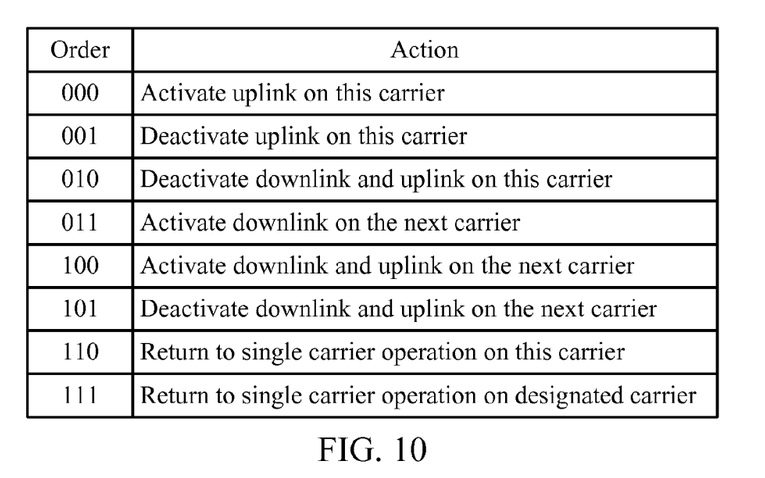
FIG. 10 is a table of another eight orders which can be transmitted on a downlink carrier to indicate a signal carrier configuration.

In another embodiment, multiple orders of a fixed length of three bits can be transmitted by the base station 200 to the user equipment 100 to communicate a desired configuration. FIG. 9 is a table of eight orders which can be transmitted on a downlink carrier to indicate a signal carrier configuration. FIG. 10 is a table of another eight orders which can be transmitted on a downlink carrier to indicate a signal carrier configuration.

Figure 11:
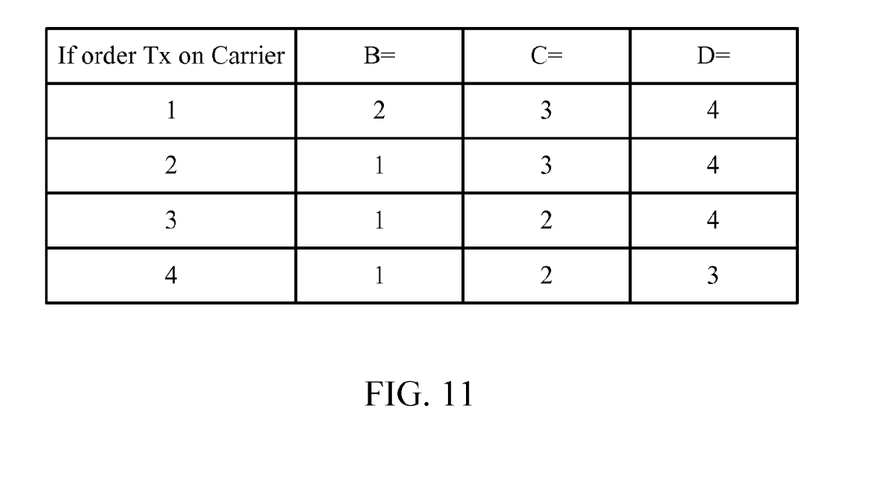
FIG. 11 is a table illustrating a mapping of pointers to other carriers based on the downlink carrier on which the order is transmitted.
Figure 12:
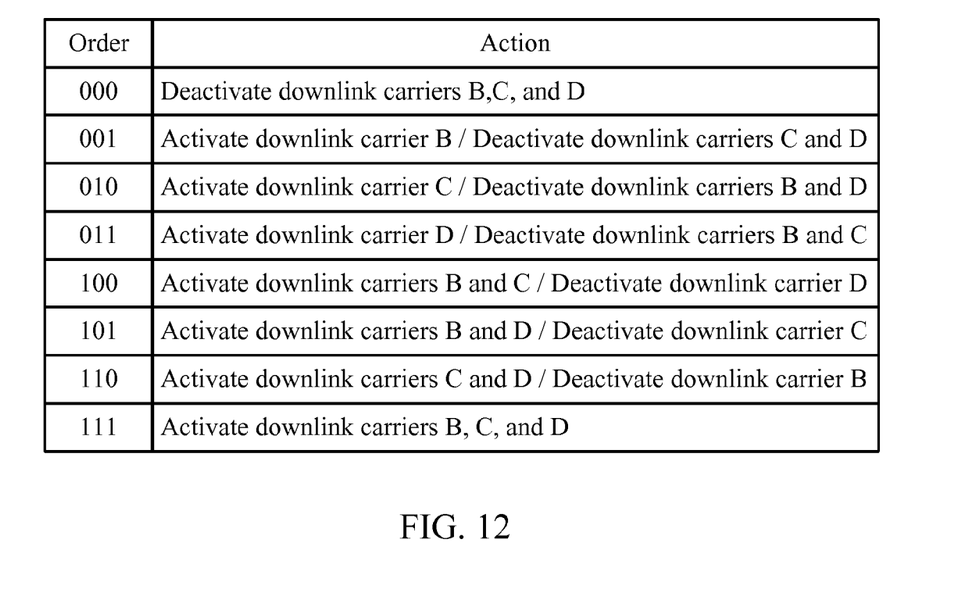
FIG. 12 is a table of eight orders which can be transmitted on a downlink carrier to indicate a downlink signal carrier configuration
Figure 13:
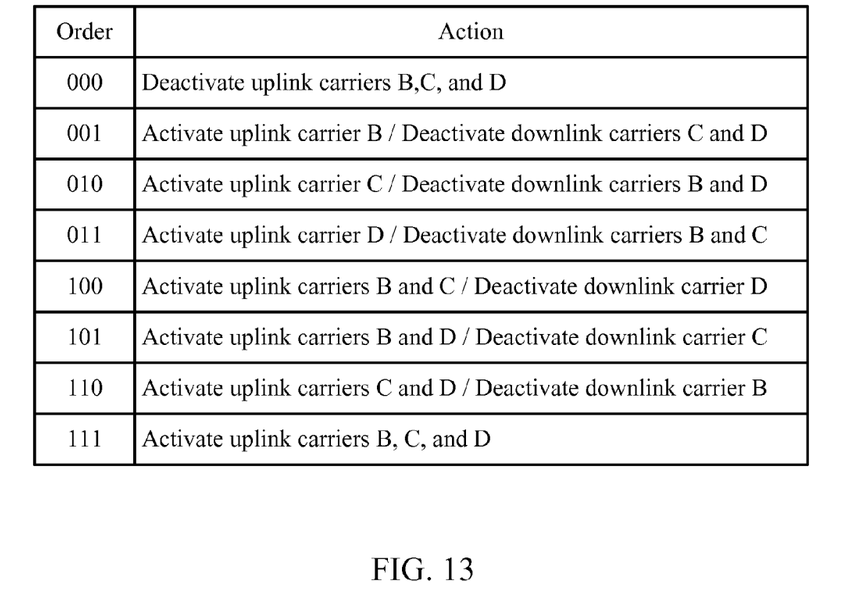
FIG. 13 is a table of eight orders which can be transmitted on a downlink carrier to indicate an uplink signal carrier configuration.

In one embodiment, the configuration of the uplink carriers and downlink carriers are communicated in separate orders. FIG. 11 is a table illustrating a mapping of pointers to other carriers based on the downlink carrier on which the order is transmitted. Further, FIG. 12 is a table of eight orders which can be transmitted on a downlink carrier to indicate a downlink signal carrier configuration and FIG. 13 is a table of eight orders which can be transmitted on a downlink carrier to indicate an uplink signal carrier configuration. For example, if order '100' of FIG. 12 were received on downlink carrier 3, the order would be interpreted as an instruction to activate, if inactive, downlink carriers 1 and 2 and to deactivate, if active, downlink carrier 4. As another example, if order '110' of FIG. 13 were received on downlink carrier 2, the order would be interpreted as an instruction to activate, if inactive, uplink carriers 3 and 4 and to deactivate, if active, uplink carrier 1.

The above embodiments, can be employed in a communication system employing the High-Speed Downlink Packet Access (HSDPA) mobile telephony communications protocol. Physical channels introduced in HSDPA includes the High Speed-Shared Control Channel (HS-SCCH), the High Speed-Dedicated Physical Control Channel (HS-DPCCH), and the High Speed-Physical Downlink Shared Channel (HS-PDSCH). In one embodiment, the HS-SCCH carries data which informs the receiving device that data will be sent over the HS-DSCH two slots later. In one embodiment, the HS-DPCCH carries acknowledgment information and channel quality indicator (CQI) information. This information can be used, e.g., by the base station to calculate how much data to send to the user devices on the next transmission. In one embodiment, the HS-PDSCH is mapped to the HS-DSCH and carries user data.

As noted above, in order to communicate a desired signal carrier configuration in a system with four uplink carriers and four downlink carriers eight bits are required. However, in one embodiment, an anchor carrier is always present. In other words, downlink carrier 1 and uplink carrier 1 are always active. Thus, only six bits are needed to communicate the possible signal carrier configurations. Each bit can correspond to a specific carrier, where a '1' indicates that the carrier should be active and a '0' indicates that the carrier should be inactive. For example, in one embodiment, a first order of three bits is transmitted which correspond to downlink carrier 2, uplink carrier 2, and downlink carrier 3 and a second order of three bits is transmitted which correspond to uplink carrier 3, downlink carrier 4, and uplink carrier 4. In another embodiment, a first order of three bits is transmitted which correspond to downlink carrier 4, downlink carrier 3, and downlink carrier 2 and a second order of three bits is transmitted which correspond to uplink carrier 4, uplink carrier 3, and uplink carrier 2. These same orders can be used when the anchor carrier is removable, wherein a third order of two bits follows the second order and the third order's bits correspond to downlink carrier 1 and uplink carrier 1.

In one embodiment having up to four active uplink carriers and up to four active downlink carriers, if two uplinks are active, at least two downlinks are active. This assumption reduces the number of possible signal carrier configurations and can reduce the number of bits required to communicate a desired signal carrier configuration. Further assumptions can be made to further reduce the number of possible single carrier configurations. As mentioned above, in one embodiment, a first uplink carrier and a first downlink carrier are always active. In another embodiment, at least one uplink carrier and at least one downlink carrier are always active. In another embodiment, an uplink carrier can only be in an active state if the corresponding downlink carrier is also in an active state. In another embodiment, at least one downlink carrier and the uplink carrier associated with that downlink carrier is always active.

Figure 14:
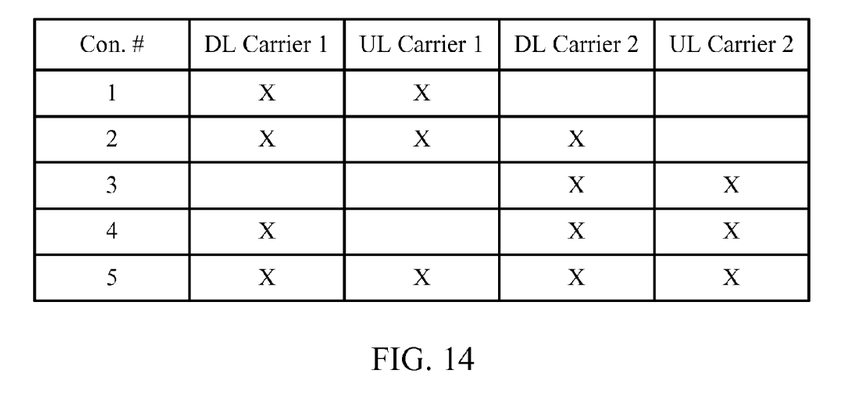
FIG. 14 is a table listing five possible signal carrier configurations.

For DC-HSUPA, FIG. 14 is a table listing five possible signal carrier configurations, in which the presence of an X in the table indicates an active carrier and the absence of an X in the table indicates an inactive carrier. Configurations 3 and 4 are possible if no L3 (Layer 3) signaling is needed to maintain the call. If it is assumed that downlink carrier 1 and uplink carrier 1 are always active, then only three configurations 1, 2, and 5 are possible.

Figure 15:
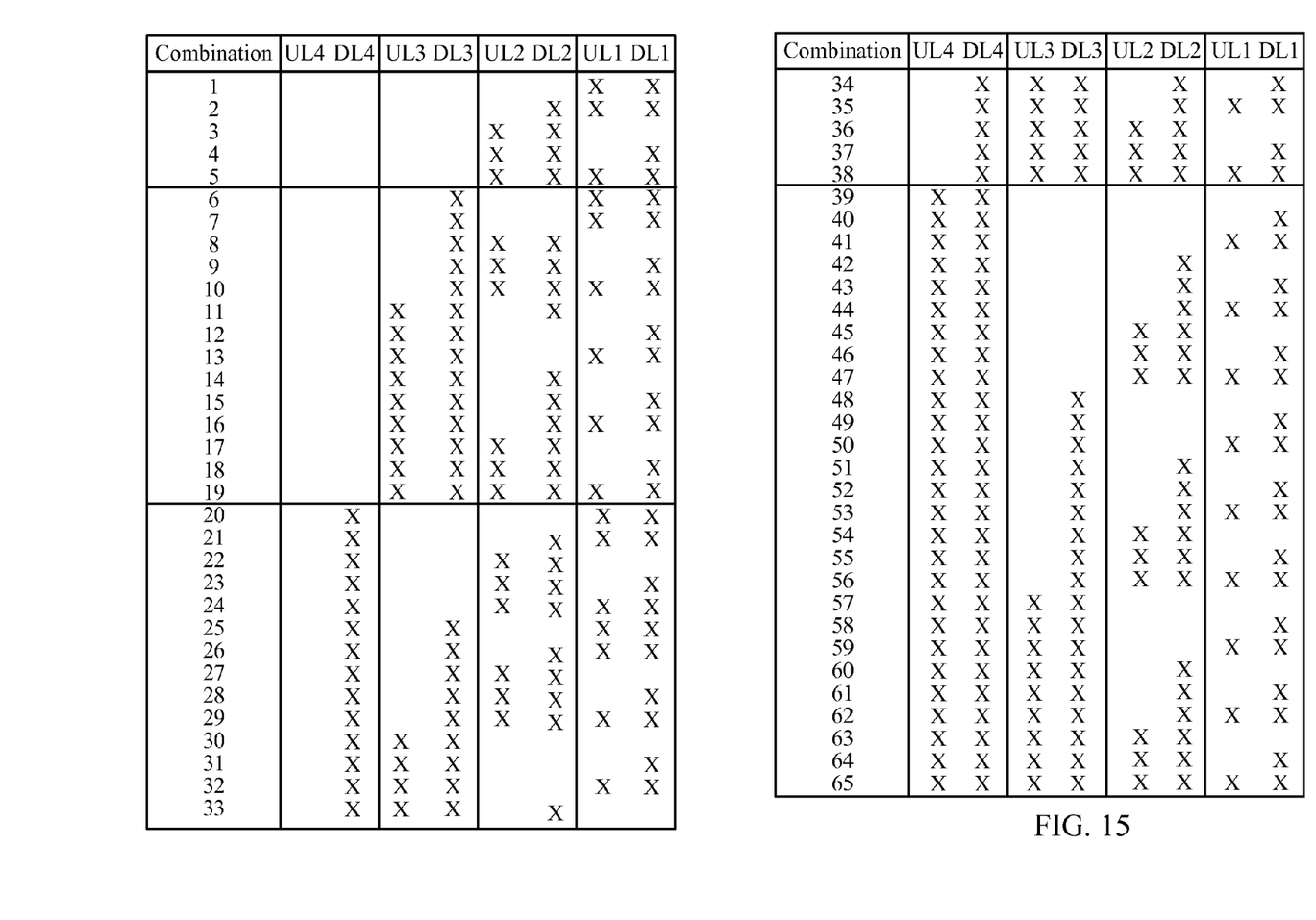
FIG. 15 lists 65 possible signal carrier configurations with four downlink carriers and four uplink carriers.

If there are four available downlink carriers and two available uplink carriers in DC-HSUPA, there are 20 possible signal carrier configurations, and only 12 if downlink carrier 1 and uplink carrier 1 are always active. If there are four available downlink carriers and four available uplink carriers, there will be 65 possible signal carrier configurations, and only 27 if downlink carrier 1 and uplink carrier 1 are always active. FIG. 15 lists the 65 possible signal carrier configurations with four downlink carriers and four uplink carriers. In FIG. 15, as in FIG. 14, the presence of an X in the table indicates an active carrier and the absence of an X in the table indicates an inactive carrier Accordingly, if there are four available downlink carriers and two available uplink carriers in DC-HSUPA, three three-bits orders will be needed to designate a signal carrier configurations, and only two if downlink carrier 1 and uplink carrier 1 are always active. If there are four available downlink carriers and four available uplink carriers, nine three-bits orders will be needed to designate a signal carrier configurations, and only four if downlink carrier 1 and uplink carrier 1 are always active.

If orders of a different length are used, less bits are required to designate a particular signal carrier configuration. If there are four available downlink carriers and two available uplink carriers in DC-HSUPA, five bits are needed to designate a signal carrier configurations, and only four bits if downlink carrier 1 and uplink carrier 1 are always active. If there are four available downlink carriers and four available uplink carriers, nine bits are needed to designate a signal carrier configurations, and only five if downlink carrier 1 and uplink carrier 1 are always active. If one of the 65 possible configurations is removed, only eight bits are need.

The aspects disclosed above, such as transmitting the order on a specific carrier and those discussed with respect to FIG. 8-13 can be employed in a DC-HSUPA system, or system employing in any mobile telephony protocol. Many of the above aspects fall into a generalized method.

Figure 16:
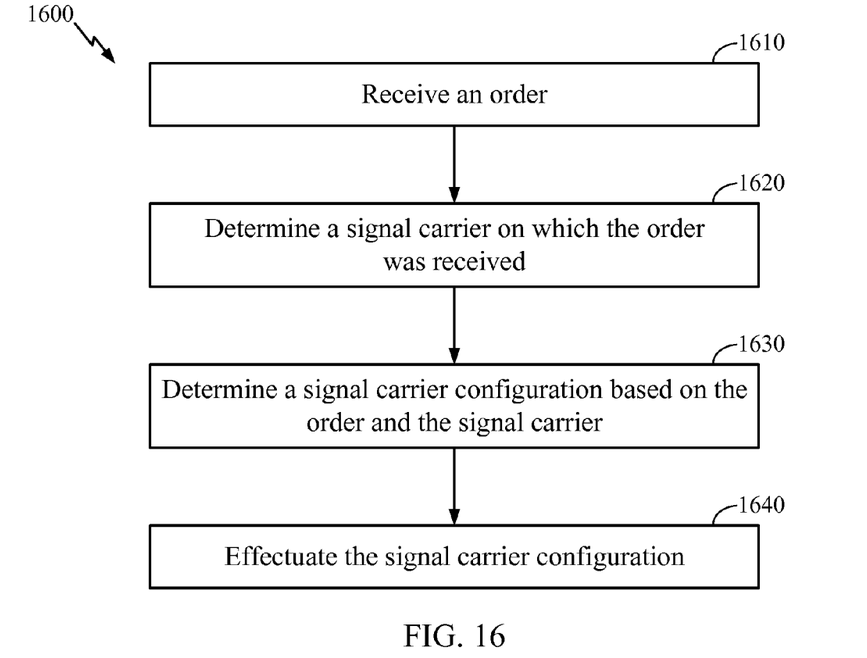
FIG. 16 is a flowchart illustrating a method of effectuating a signal carrier configuration.

FIG. 16 is a flowchart illustrating a method of effectuating a signal carrier configuration which can be performed, for example, by the user equipment 100 of FIG. 1. The method can also be performed by a different communication device, such as the base station 200. The method 1600 begins, in block 1610, with the reception of an order. The reception can be performed, for example, by at least one of the processor 110, the modem 150, the transceiver 160, or the antenna 170. In one embodiment, the order is of a predetermined length. For example, the order may be two bits, three bits, or more bits. The order may be packaged in a large reception which further indicates an order type.

Next, in block 1620, a signal carrier on which the order was received is determined. The determination can be performed, for example, by at least one of the processor 110, the modem 150, the transceiver 160, or the antenna 170. In one embodiment, the determined signal carrier is one of a predetermined set of available signal carriers. In another embodiment, the determined signal carrier is one of a set of active signal carriers.

Continuing to block 1630, a signal carrier configuration is determined based at least in part on the order and the determined signal carrier. For example, if there are two active downlink carriers and two active uplink carriers, the configuration lists of FIGS. 6 and 7 are being used, and the order '011' is received on the second downlink carrier, then the signal configuration is that listed as configuration 12 in FIG. 6. If it were not determined which downlink carrier the order was received on, the user equipment 100 could not determine if the order '011' indicated signal carrier configuration 4 or 12. By determining which signal carrier the order was received on, the user equipment 100 can uniquely determine a signal carrier configuration.

Finally, in block 1640, the state of one or more signal carriers is changed to effectuate the signal carrier configuration. Changing the state of one or more signal carriers can be performed, for example, by at least one of the processor 110, the memory 120, the modem 150, the transceiver 160, or the antenna 170. In one embodiment, changing the state of a signal carrier includes activating a signal carrier and data may be communicated over the signal carrier. In another embodiment, changing the state of a signal carrier includes deactivating a signal carrier and data may not be communicated over the signal carrier. In another embodiment, changing the state of a signal carrier comprises changing data stored in the memory 120 indicative of which carriers are active and/or inactive.

Figure 17:
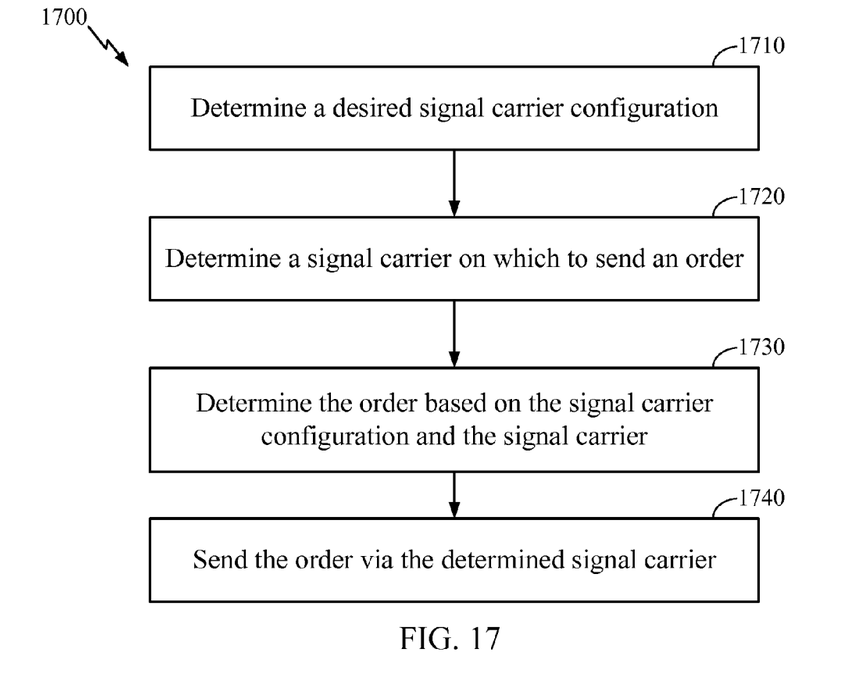
FIG. 17 is a flowchart illustrating a method of sending an order.

FIG. 17 is flowchart illustrating a method of sending an order which can be performed, for example, by the base station 200 of FIG. 1. The method can also be performed by a different communication device, such as the user equipment 100. The method 1700 begins, in block 1710, with the determination of a desired signal carrier configuration. The determination of a desired signal carrier configuration can be performed, for example, by the processor 210

Next, in block 1720, a signal carrier on which to send an order is determined. Again, such determination can be performed by the processor 210. In one embodiment, the determined signal carrier is one of a predetermined set of available signal carriers. In another embodiment, the determined signal carrier is one of a set of active signal carriers.

Continuing to block 1730, the order is determined based at least in part on the desired signal carrier configuration and the determined signal carrier. Such determination can be performed by the processor 210, possibly in conjunction with the memory 220. The memory 220 can, for example, store a list of configurations or a list of orders such as those of FIG. 2-15. In one embodiment, the order is of a predetermined length. For example, the order may be two bits, three bits, or more bits. The order may be packaged in a large transmission which further indicates an order type.

Finally, in block 1740, the order is transmitted via the determined signal carrier. The transmission can be performed by at least one of the processor 210, transceiver 260, or antenna 270.

Figure 18:
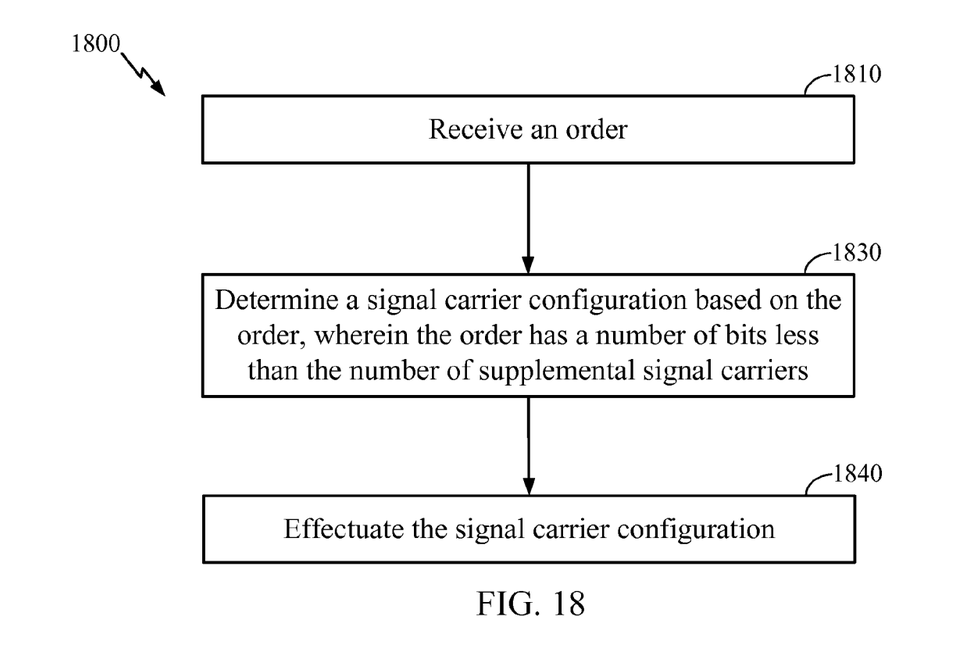
FIG. 18 is a flowchart illustrating another method of effectuating a signal carrier configuration.

FIG. 18 is a flowchart illustrating another method of effectuating a signal carrier configuration which can be performed, for example, by the user equipment 100 of FIG. 1. The method 1800 can also be performed by a different communication device, such as the base station 200. The method 1800 begins, in block 1810, with the reception of an order having a number of bits. The reception can be performed, for example, by at least one of the processor 110, the modem 150, the transceiver 160, or the antenna 170. In one embodiment, the order is of a predetermined number of bits. For example, the order may be two bits, three bits, or more bits. The order may be packaged in a large reception which further indicates an order type.

Continuing to block 1830, a signal carrier configuration indicative of a state each of a number of supplemental signal carriers is determined based at least in part on the order. In some communication systems, a communication link between the user equipment 100 and a base station 200 comprises at least one primary link, which cannot be activated or deactivated while the communication link is established, and one or more supplemental links, which can be activated or deactivated while the communication link is established according to a signal carrier configuration. In one embodiment, the communication link includes a primary uplink and a primary downlink as well as one or more supplemental uplinks and one or more supplemental downlinks.

In one embodiment of an established communication link, there is a single primary uplink signal carrier and a single primary downlink signal carrier, and three supplemental uplink signal carriers and three supplemental downlink signal carriers. In one embodiment of the method 1800, an order indicative of a state of each of the supplemental signal carriers (both uplink and downlink) is less than six bits. In another embodiment, an order indicative of a state of each of the supplemental downlink carriers is less than three bits.

Finally, in block 1840, the state of one or more of the supplemental signal carriers is changed to effectuate the signal carrier configuration. Changing the state of one or more of the supplemental signal carriers can be performed, for example, by at least one of the processor 110, the memory 120, the modem 150, the transceiver 160, or the antenna 170. In one embodiment, changing the state of a supplemental signal carrier includes activating a supplemental signal carrier and data may be communicated over the signal carrier. In another embodiment, changing the state of a supplemental signal carrier includes deactivating a signal carrier and data may not be communicated over the signal carrier. In another embodiment, changing the state of a signal carrier comprises changing data stored in the memory 120 indicative of which carriers are active and/or inactive.

Figure 19:
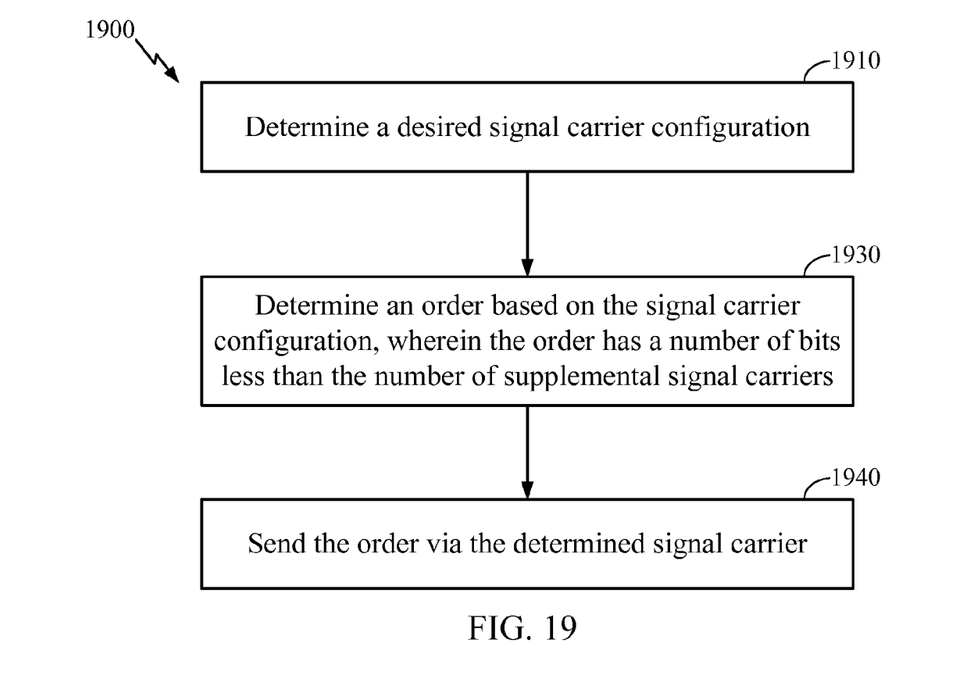
FIG. 19 is a flowchart illustrating another method of sending an order.

FIG. 19 is flowchart illustrating another method of sending an order which can be performed, for example, by the base station 200 of FIG. 1. The method 1900 can also be performed by a different communication device, such as the user equipment 100. The method 1900 begins, in block 1910, with the determination of a desired signal carrier configuration. The determination of a desired signal carrier configuration can be performed, for example, by the processor 210. The desired signal carrier configuration may be indicative of a state of each of number of supplemental signal carriers. As described above with respect to FIG. 18, in some communication systems, a communication link between the user equipment 100 and a base station 200 comprises at least one primary link, which cannot be activated or deactivated while the communication link is established, and one or more supplemental links, which can be activated or deactivated while the communication link is established according to a signal carrier configuration. In one embodiment, the communication link includes a primary uplink and a primary downlink as well as one or more supplemental uplinks and one or more supplemental downlinks.

Continuing to block 1930, an order is determined based at least in part on the desired signal carrier configuration, wherein the order has a number of bits less than the number of supplemental signal carriers. Such determination can be performed by the processor 210, possibly in conjunction with the memory 220. The memory 220 can, for example, store a list of configurations or a list of orders such as those of FIG. 2-15. In one embodiment, the order is of a predetermined number of bits. For example, the order may be two bits, three bits, or more bits. The order may be packaged in a large transmission which further indicates an order type.

Finally, in block 1940, the order is transmitted. The transmission can be performed by at least one of the processor 210, transceiver 260, or antenna 270.

While the specification describes particular examples of the present invention, those of ordinary skill can devise variations of the present invention without departing from the inventive concept. Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. The terms signal and threshold can depend upon the signal modulation technique. If pulse amplitude modulation (PAM) is used then the voltage amplitude or power of the signal represents its value. In that case the threshold is simply a power value. If phase shift keying is used, then the phase of the signal, which can translate to the sign of the received signal voltage can represent the signal value. In this case if the signal is integrated over multiple symbols, then the sign and amplitude of the received signal together indicate the signal value.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The above description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the claims.

What is claimed is:

1. A method of effectuating a signal carrier configuration in a wireless communication system, the method comprising:
   receiving an order having a number of bits;
   identifying a signal carrier on which the order was received;
   determining a signal carrier configuration indicative of a state of each of a number of supplemental signal carriers based at least in part on the order and the identity of the signal carrier on which the order was received, wherein the number of bits is less than the number of supplemental signal carriers; and
   changing a state of one or more of the supplemental signal carriers to effectuate the signal carrier configuration.

2. The method of claim 1, wherein changing the state comprises at least one of activation of one or more of the supplemental signal carriers or deactivation of one or more of the supplemental signal carriers.

3. The method of claim 1, wherein the order is of a predetermined number of bits.

4. The method of claim 3, wherein the predetermined number of bits is three.

5. The method of claim 1, wherein the order is an HS-SCCH order.

6. The method of claim 1, wherein the determined signal carrier configuration is based at least in part on a configuration state table comprising less than 2N entries, wherein N is the number of supplemental signal carriers.

7. The method of claim 1, wherein changing the state comprises changing the state of the determined signal carrier, a previous signal carrier of the determined signal carrier, or a next signal carrier of the determined signal carrier.

8. The method of claim 1, wherein changing the state comprises changing the state of one or more signal carriers relative to the determined signal carrier.

9. The method of claim 1, wherein determining the signal carrier configuration comprises referencing an order table associated with the determined signal carrier.

10. The method of claim 1, wherein the order is transmitted non-contiguously as a first sub-order and a second sub-order.

11. An electronic device comprising:
    a transceiver configured to communicate with a base station over at least one primary carrier and a number of active supplemental signal carriers selected from a number of supplemental signal carriers as determined by a signal carrier configuration; and
    a processor configured to:
    receive an order having a number of bits via the transceiver, wherein the number of bits is less than the number of supplemental signal carriers,
    identify a signal carrier on which the order was received,
    determine an ordered signal carrier configuration indicative of a state of each of the supplemental signal carriers based at least in part on the order and the identity of the signal carrier on which the order was received, and
    reconfigure the transceiver to communicate with the base station over the at least one primary signal carrier and a number of active supplemental signal carriers selected from the number of supplemental signal carriers as determined by the ordered signal carrier configuration.

12. The electronic device of claim 11, wherein the order is an HS-SCCH order.

13. The electronic device of claim 11, wherein the at least one primary carrier is unaffected by the order.

14. An electronic device comprising:
    means for receiving an order having a number of bits;
    means for identifying a signal carrier on which the order was received;
    means for determining a signal carrier configuration indicative of a state of each of a number of supplemental signal carriers based at least in part on the order and the identity of the signal carrier on which the order was received, wherein the number of bits is less than the number of supplemental signal carriers; and means for changing a state of one or more of the supplemental signal carriers to effectuate the signal carrier configuration.

15. A non-transitory computer-readable storage medium having instructions encoded thereon which, when executed by one or more processors, causes an electronic device to perform a method of effectuating a signal carrier configuration, the method comprising:

receiving an order having a number of bits;

identifying a signal carrier on which the order was received;

determining a signal carrier configuration indicative of a state of each of a number of supplemental signal carriers based at least in part on the order and the identity of the signal carrier on which the order was received, wherein the number of bits is less than the number of supplemental signal carriers; and changing the state of one or more of the supplemental signal carriers to effectuate the signal carrier configuration.

16. A method of transmitting an order in a wireless communication system, the method comprising:

determining a desired signal carrier configuration indicative of a state of each of a number of supplemental signal carriers;

selecting a signal carrier on which to send the order;

determining an order based at least in part on the desired signal carrier configuration and the selected signal carrier on which the order is to be sent, the order having a number of bits less than the number of supplemental signal carriers; and sending the order via the selected signal carrier.

17. The method of claim 16, wherein the order is of a predetermined number of bits.

18. The method of claim 17, wherein the predetermined number of bits is three.

19. The method of claim 16, wherein the order is an HS-SCCH order.

20. The method of claim 16, wherein the desired signal carrier configuration is based at least in part on a configuration state table comprising less than 2N entries, wherein N is the number of supplemental signal carriers.

21. The method of claim 16, wherein the order indicates a change of state of the determined signal carrier, a previous signal carrier of the determined signal carrier, or a next signal carrier of the determined signal carrier.

22. The method of claim 16, wherein the order indicates a change of state of one or more signal carriers relative to the determined signal carrier.

23. The method of claim 16, wherein the determined signal carrier is determined from a plurality of active signal carriers.

24. An electronic device for transmitting an order in a wireless communication system, comprising:

a transceiver configured to communicate with a user device over at least one primary carrier and a number of active supplemental carriers selected from a number of supplemental signal carriers according to a signal carrier configuration; and a processor configured to:

determine a desired signal carrier configuration, select a signal carrier on which to send the order, determine an order based at least in part on the desired signal carrier configuration and the selected signal carrier on which the order is to be sent, the order having a number of bits less than the number of supplemental signal carriers, and send, using the transceiver, the order via the selected signal carrier.

25. The electronic device of claim 24, wherein the order is an HS-SCCH order.

26. An electronic device for transmitting an order in a wireless communication system comprising:

means for determining a desired signal carrier configuration indicative of a state of each of number of supplemental signal carriers;

means for selecting a signal carrier on which to send the order;

means for determining an order based at least in part on the desired signal carrier configuration, and the selected signal carrier on which the order is to be sent the order having a number of bits less than the number of supplemental signal carriers; and means for sending the order via the selected signal carrier.

27. A non-transitory computer-readable storage medium having instructions encoded thereon which, when executed by one or more processors, causes an electronic device to perform a method of sending an order, the method comprising:

determining a desired signal carrier configuration indicative of a state of each of number of supplemental signal carriers;

selecting a signal carrier on which to send the order;

determining the order based at least in part on the desired signal carrier configuration and the selected signal carrier on which the order is to be sent, the order having a number of bits less than the number of supplemental signal carriers; and sending the order via the selected signal carrier.

* * * * *